US008830894B2

(12) United States Patent
Xu

(10) Patent No.: US 8,830,894 B2
(45) Date of Patent: Sep. 9, 2014

(54) NOTIFICATION METHOD AND SYSTEM FOR INFORMATION CHANGE OF MULTIMEDIA BROADCAST MULTICAST SERVICE CONTROL CHANNEL

(75) Inventor: Hui Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 322 days.

(21) Appl. No.: 13/257,801

(22) PCT Filed: Nov. 25, 2009

(86) PCT No.: PCT/CN2009/075128
§ 371 (c)(1),
(2), (4) Date: Dec. 14, 2011

(87) PCT Pub. No.: WO2010/145120
PCT Pub. Date: Dec. 23, 2010

(65) Prior Publication Data
US 2012/0093051 A1 Apr. 19, 2012

(30) Foreign Application Priority Data

Jun. 19, 2009 (CN) .......................... 2009 1 0087386

(51) Int. Cl.
*H04H 20/71* (2008.01)
*H04L 12/18* (2006.01)
*H04W 72/00* (2009.01)
(52) U.S. Cl.
CPC ......... *H04W 72/005* (2013.01); *H04L 12/1895* (2013.01); *H04L 12/189* (2013.01)
USPC .......................................... 370/312; 370/311
(58) Field of Classification Search
USPC ............................................... 370/311, 312
See application file for complete search history.

(56) References Cited

U.S. PATENT DOCUMENTS 7,606,226 B2 * 10/2009 Yi et al. .......................... 370/390
7,864,722 B2 * 1/2011 Yi et al. .......................... 370/312
(Continued)

FOREIGN PATENT DOCUMENTS

| CN | 101163026 A | 4/2008 |
| CN | 101203012 A | 6/2008 |

(Continued)

OTHER PUBLICATIONS

3GPP TS 25.346 V8.3.0, 3GPP Mar. 16, 2009.
(Continued)

*Primary Examiner* — Kenny Lin
(74) *Attorney, Agent, or Firm* — Oppedahl Patent Law Firm LLC

(57) ABSTRACT

A notification method for an information change of a Multimedia Broadcast Multicast Service Control Channel (MCCH) comprises: a base station side indicates with a Multimedia Broadcast Multicast Service Radio Network Temporary Identity (M-RNTI) that information of an MCCH has a change, and notifies a User Equipment (UE) side; after detecting the M-RNTI, the UE continues reading the information of the MCCH or determines whether to continue reading the changed information of the MCCH according to service requirements of itself. A notification system for an information change of an MCCH comprises a notification unit on a base station side. When the base station side indicates with an M-RNTI that the information of the MCCH has a change, the notification unit on the base station side notifies the UE side. The notification mechanism for an information change of an MCCH is implemented by the method and the system. The UE monitors an information change of an MCCH, and the power consumption of the UE is reduced accordingly.

7 Claims, 2 Drawing Sheets

(56) References Cited

U.S. PATENT DOCUMENTS

| | | | |
|---|---|---|---|
| 2003/0194992 A1* | 10/2003 | Kim et al. | 455/414.1 |
| 2005/0020260 A1* | 1/2005 | Jeong et al. | 455/434 |
| 2008/0316964 A1* | 12/2008 | Fischer | 370/329 |
| 2010/0142429 A1* | 6/2010 | Yi et al. | 370/312 |
| 2010/0303023 A1* | 12/2010 | Nader | 370/329 |
| 2011/0038299 A1* | 2/2011 | Sugawara et al. | 370/312 |
| 2012/0039228 A1* | 2/2012 | Wang et al. | 370/311 |

FOREIGN PATENT DOCUMENTS

| | | |
|---|---|---|
| JP | 2006524444 A | 10/2006 |
| WO | 2008033072 A1 | 3/2008 |

OTHER PUBLICATIONS

3GPP TS 23.246 V9.1.0, 3GPP Jun. 9, 2009.
Samsung, M-RNTI for MBMS control channel (MCCH structure), 3GPP Tdoc R2-030191, 3GPP Feb. 17, 2003.
International Search Report in international application No. PCT/CN2009/075128, mailed on Mar. 25, 2010.
English Translation of the Written Opinion of the International Search Authority in international application No. PCT/CN2009/075128, mailed on Mar. 25, 2010.
MCCH change notification and termination.
CMCC: "Discussion on notification mechanism for eMBMS", 3GPP Draft R2-093521 Discussion on notification mechanism for EMBMS-V1, 3rd Generation Partnership Project (3GPP), Mobile Competence Centre, 650, Route Des Lucioles, F-06921 Sophia-Antipolis Cedex, France, vol. RAN WG2 No. 66, San Francisco, USA; May 6, 2009.
Potevo: "Notification of Information Change on MCCH", 3GPP Draft R2-093298 Notification of information change on MCCH, 3rd Generation Partnership Project (3GPP), Mobile Competence Centre, 650, Route Des Lucioles, F-06921 Sophia-Antipolis Cedex, France, vol. RAN WG2, No. 66, San Francisco, USA; May 4, 2009-May 8, 2009, Apr. 29, 2009.
Alcatel-Lucent Shanghai Bell et al: "Notification mechanism design for eMBMS", 3GPP Draft; R2-093095 Notification mechanism design for EMBMS, 3rd Generation Partnership Project (3GPP), Mobile Competence Centre, 650, Route Des Lucioles, F-06921 Sophia-Antipolis Cedex, France, vol. RAN WG2 No. 66, San Francisco, USA; Apr. 27, 2009.
3GPP Draft; R2-092904 MBMS Notification indication R1, 3rd Generation Partnership Project (3GPP), Mobile Competence Centre, 650, Route Des Lucioles , F-06921, Sophia-Antipolis Cedex, France, vol. RAN WG2 No. 66, San Francisco, USA; Apr. 27, 2009.
3GPP Draft; R2-092227 MBMS Notification RO, 3rd Generation Partnership Project (3GPP), Mobile Competence Centre, 650, Route Des Lucioles, F-06921, Sophia-Antipolis Cedex, France, vol. RAN WG2 No. 65bis, Seoul, Korea; Mar. 16, 2009.
Supplementary European Search Report in European application No. 09846034.8, mailed on Dec. 11, 2013.
LG Electronics Inc., "Discussion on MCCH Update Notification," 3GPP TSG-RAN WG2 #61, R2-081086, Feb. 15, 2008. (3 pages—see entire document).

\* cited by examiner

NOTIFICATION METHOD AND SYSTEM FOR INFORMATION CHANGE OF MULTIMEDIA BROADCAST MULTICAST SERVICE CONTROL CHANNEL

TECHNICAL FIELD

The present invention relates to the notification technology of an information change of a Control Channel in a Long Term Evolution (LTE) system, in particular to a notification method and system for an information change of a Multimedia Broadcast Multicast Service Control Channel.

BACKGROUND

With the fast development of the Internet and the popularization of large-screen multifunctional mobile phones, a great amount of mobile data multimedia services and various high bandwidth multimedia services have emerged, such as video conferences, television broadcast, video on demand, advertisements, network education, interactive games, etc, which not only satisfy the continuously-increasing service requirements of mobile subscribers, but also bring a new service growth point to mobile operators. These mobile data multimedia services require a plurality of subscribers to be capable of receiving the same data at the same time and have the characteristics of large amount of data, long duration and sensitivity to a time delay, compared with common data services.

In order to utilize mobile network resources effectively, the 3rd Generation Partnership Project (3GPP) propose a Multimedia Broadcast Multicast Service (MBMS), which is the technology capable of transmitting data from one data source to a plurality of targets, realizes the sharing of network resources, including a Core Network and an Access Network, and improves the utilization rate of network resources, especially that of air interface resources. The MBMS defined by the 3GPP can realize multicast and broadcast of plain-text and low-speed information as well as that of high-speed multimedia services, and provides various abundant videos, audios and multimedia services, which undoubtedly conforms to the development tendency of mobile data in the future and brings better service prospects to the development of 3rd Generation (3G).

An MBMS Control Channel (MCCH, Multicast Control Channel) in LTE Rel-8 is designed into a layered structure, wherein a Primary MCCH (P-MCCH) is used for bearing signaling of the P-MCCH, which is known as primary multicast control signaling; and a Secondary MCCH (S-MCCH) is used for bearing signaling of the S-MCCH, which is known as secondary multicast control signaling. It is prescribed in the LTE Rel-8 that scheduling information of one or two P-MCCHs is indicated on a Broadcast Control Channel (BCCH), wherein one P-MCCH is of a single-cell mode and transmitted on a DownLink-Shared Channel (DL-SCH), and the other P-MCCH is of a multi-cell mode and transmitted on a Multicast Channel (MCH). Indication information of the S-MCCH can be borne in the P-MCCH so as to be helpful to discover the S-MCCH. Control signaling related to a service in a Multicast/Broadcast over Single Frequency Network (MBSFN) area is borne in the P-MCCH of the multi-cell mode, and the control signaling illustrates an effective MBMS service and other information which does not include time-frequency resource distribution information of services in the area. In the latest work item description of LTE Rel-9, the description about an MCCH is that the MCCH does not support the amalgamation of MBSFNs and may not consider the primary-secondary structure.

For a certain MBMS, a plurality of events may exist, such as start of an MBMS conversation, change of an MBMS Radio Bearer (RB), stop of the MBMS, etc. In general, User Equipment (UE) does not know when the events may happen. In order to decrease the power consumption of UE and realize Discontinuous Reception (DRX) at the UE, it is impractical for the UE to monitor an MCCH continuously, so, a notification mechanism for an information change of an MCCH is required to be designed, so that the UE can only monitors changed MCCH information. At present, the LTE system has no solution to the notification mechanism for an information change of an MCCH.

SUMMARY

In view of the above mentioned, the present invention mainly aims to provide a notification method and system for an information change of an MCCH, realizing a notification mechanism for an information change of the MCCH, making UE monitor information changes of the MCCH, therefore reducing power consumption of the UE.

In order to achieve the above purpose, the technical solutions of the present invention are implemented as follow.

A notification method for an information change of an MCCH comprises: on a base station side, indicating with a Multimedia Broadcast Multicast Service Radio Network Temporary Identifier (M-RNTI) that information of an MCCH has a change, and notifying a UE side; and on the UE side, after detecting the M-RNTI, continuing reading the information of the MCCH or determining whether to continue reading changed information of the MCCH according to service requirements of the UE.

Furthermore, the notifying may comprise:
notifying, by an evolved Node B (eNB), the UE of position information of the M-RNTI via a system broadcast message; and encapsulating, by the eNB, an MBMS Identifier into Downlink Control Information (DCI) corresponding to the M-RNTI.

Furthermore, the UE acquiring content of the DCI after detecting the M-RNTI according to the position information of the M-RNTI, and continuing reading the information of the MCCH or determining whether to continue reading the changed information of the MCCH may comprise:
reading, by the UE, DCI corresponding to the M-RNTI according to the M-RNTI and continuing reading corresponding information of the MCCH; or acquiring the MBMS Identifier from the DCI and matching the MBMS identifier with that in an MBMS list on the UE side; if the both MBMS Identifiers are matched, continuing reading the changed information of the MCCH, if not, not reading the changed information of the MCCH.

Furthermore, the method may further comprise: in a single-cell mode, bearing the M-RNTI on a Physical Downlink Control Channel (PDCCH) of a subframe bearing a unicast service; and sending by the eNB the M-RNTI repeatedly on the PDCCH on each paging occasion during a DRX period; and
in a multi-cell mode, configuring a radio frame and a subframe thereof that bear an MBMS for an MBSFN area according to related information of the MBMS in the MBSFN area; and bearing the M-RNTI on a PDCCH of the configured subframe bearing the MBMS.

A notification system for an information change of an MCCH comprises a notification unit on a base station side and a reading unit on a UE side; or the system comprises a notification unit on a base station side and a determination unit on a UE side;

wherein the notification unit on the base station side is configured for the base station side to indicate with an M-RNTI that information of an MCCH has a change, and notify the UE side;

the reading unit on the UE side is configured for UE to continue reading the information of the MCCH after the UE detects the M-RNTI;

and the determination unit on the UE side is configured for the UE to determine whether to continue reading changed information of the MCCH according to service requirements of itself after the UE detects the M-RNTI.

Furthermore, the notification unit may be further configured to notify the UE of position information of the M-RNTI via a system broadcast message and encapsulate an MBMS Identifier into DCI corresponding to the M-RNTI.

Furthermore, the determination unit may further comprise a detection module, an acquisition module and a matching module;

wherein the detection module is configured for the UE to detect the M-RNTI according to the position information of the M-RNTI;

the acquisition module is configured for the UE to read DCI corresponding to the M-RNTI according to the M-RNTI and acquire the MBMS Identifier from the DCI;

and the matching module is configured to match the MBMS Identifier with that in an MBMS list on the UE side, and if the both MBMS Identifiers are matched, continue reading the changed information of the MCCH, if not, not read the changed information of the MCCH.

According to the present invention, a base station side indicates with an M-RNTI that information of an MCCH has a change, and notifies the UE side; and after the UE detects the M-RNTI, the UE continues reading the information of the MCCH or determines whether to continue reading changed information of the MCCH according to service requirements of itself.

By adopting the present invention, since a base station side and a UE side with an MBMS appoint an M-RNTI beforehand, when the base station side indicates with the M-RNTI that information of an MCCH has a change, the UE side can know this change as soon as it acquires the M-RNTI, and then monitors an information change of the MCCH accordingly; while the prior art has a disadvantage that UE needs to monitor an MCCH continuously which causes increased power consumption of the UE. It can be seen that the power consumption of UE with an MBMS can be greatly reduced by adopting the preset invention. Besides, an M-RNTI is appointed beforehand by a base station side and UE side with an MBMS, so non-MBMS UE does not perform identification or monitoring, thereby reducing the power consumption of the non-MBMS UE.

DETAILED DESCRIPTION

Figure 1:
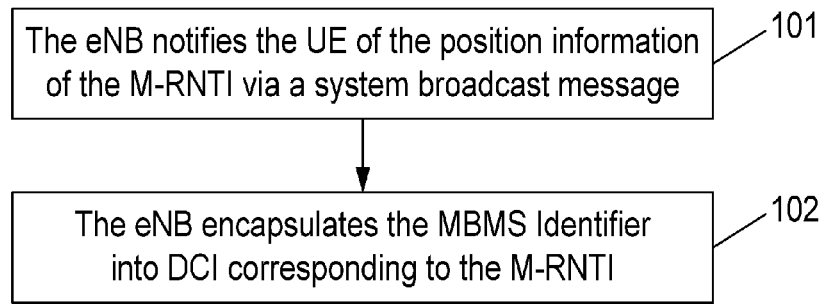
FIG. 1 is a flow chart of a base station side notifying a UE side of an information change of an MCCH according to the present invention.

The basic idea of the present invention is that a base station side indicates with an M-RNTI that information of an MCCH has a change, and notifies a UE side; and after detecting the M-RNTI, the UE continues reading the information of the MCCH or determines whether to continue reading changed information of the MCCH according to service requirements of itself.

The implementation of the technical solution is described in detail in combination with the drawings below.

First, the idea of introducing a notification mechanism for an information change of an MCCH into an LET system is described as follows:

the notification mechanism is implemented with the purpose of notifying UE through related signaling when information of an MCCH changes. In an existing 3GPP Rel-6 system, it is necessary to design independently and adopt a special channel for an MBMS for indicating an information change and changes of the MCCH, and the special channel is an MBMS Indication Channel (MICH) and used for realizing the notification mechanism for the MCCH. In the LTE system, it is also needed for the MBMS to consider how the notification mechanism for the MCCH is realized. Considering that the information characteristic of the MCCH is similar with that of the BCCH and a change of system information can be notified to the UE by paging signaling, therefore, it may be considered to notify the UE of an information change of the MCCH in such way similar to the paging signaling. Based on this consideration, the present invention provides an indication of an MCCH information change, i.e. an M-RNTI, according to the characteristics of the MCCH, so as to realize the notification mechanism for the information change of the MCCH.

Specifically, an evolved Node B (eNB) on the system side sends the M-RNTI repeatedly on each paging occasion during a DRX period, and the UE receives the M-RNTI on paging occasions and determines whether to further receive the information of the MCCH. Through this method, the power consumption of the UE can be reduced during the process of receiving the MBMS. By adopting the present invention, the UE can acquire the M-RNTI according to the position of the M-RNTI, and may continue reading the information of the MCCH or further determine whether to read the changed information of the MCCH according to the information corresponding to the M-RNTI, thereby achieving the effects of reducing the power consumption of the UE and is receiving the MBMS Control Channel accurately. Besides, an indication is given through a specific M-RNTI design, so that non-MBMS users do not need to read the M-RNTI on each paging occasion, thereby reducing the power consumption of the non-MBMS UE.

A notification method for an information change of an MCCH comprises: a base station side indicates with an M-RNTI that information of the MCCH has a change, and notifies a UE side; and after detecting the M-RNTI, the UE continues reading the information of the MCCH or determines whether to continue reading changed information of the MCCH according to service requirements of itself. Therefore, the UE side does not need to monitor the MCCH continuously and can know that the information of the MCCH has a change as long as it acquires the M-RNTI, so that the UE can only monitor the changed MCCH information.

As shown in FIG. 1, the realization flow of the base station side notifying the UE side of an information change of the MCCH comprises the following steps:

step 101: the eNB notifies the UE of position information of an M-RNTI via a system broadcast message; and step 102: the eNB encapsulates an MBMS Identifier into DCI (Downlink Control Information) corresponding to the M-RNTI.

It should be pointed out that the eNB sends the M-RNTI repeatedly on each paging occasion during a DRX period.

Figure 2:
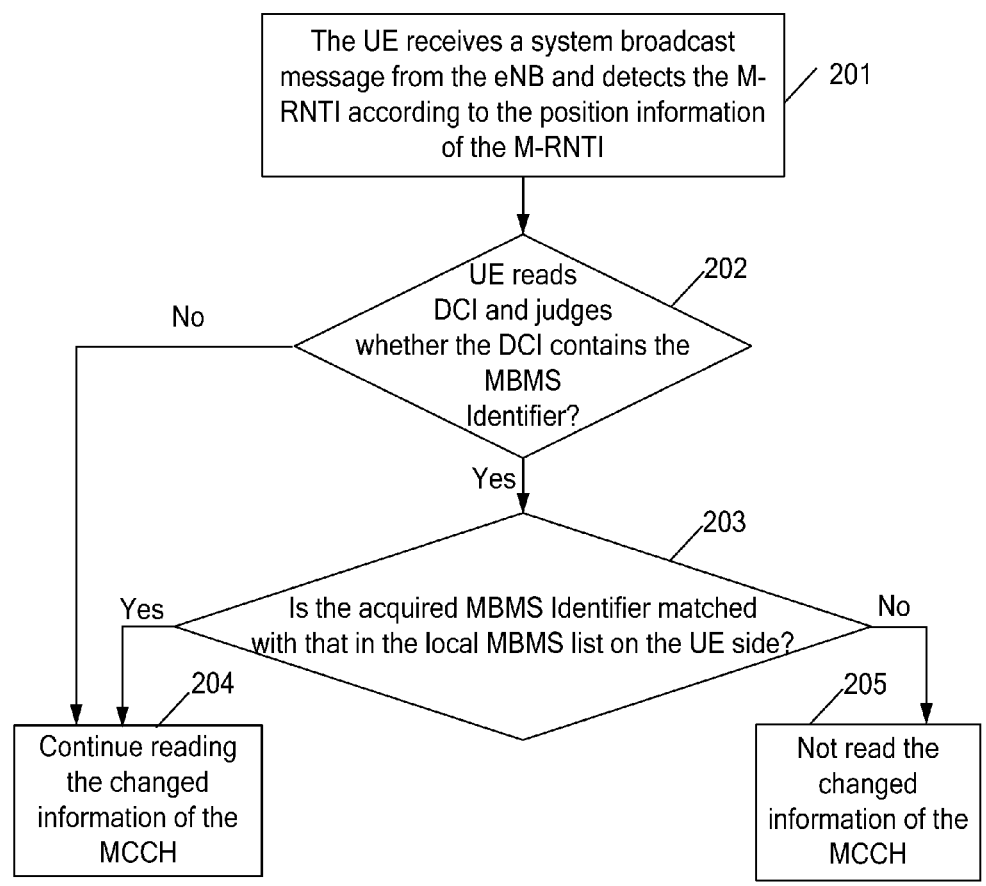
FIG. 2 is flow chart of UE determining to read changed information of an MCCH according to the present invention.

As shown in FIG. 2, the realization flow of the UE reading the changed information of the MCCH comprises the following steps:

step 201: the UE receives the system broadcast message from the eNB and detects the M-RNTI according to the position information of the M-RNTI;

step 202: the UE reads the DCI corresponding to the M-RNTI according to the M-RNTI, and if an MBMS Identifier exists in the DCI, then step 204 will be executed, if not, then step 203 will be executed;

step 203: the UE determines whether the acquired MBMS Identifier is matched with that in a local MBMS Identifier list on the UE side, and if the both MBMS Identifiers are matched, then step 204 will be executed, if not, then step 205 will be executed;

step 204: the UE continues reading the changed information of the MCCH; and step 205: the UE does not read the changed information of the MCCH.

It should be pointed out that the UE detects the M-RNTI sent repeatedly by the eNB on each paging occasion according to the position information of the M-RNTI.

The method further comprises: in a single-cell mode, the M-RNTI is borne on a PDCCH (Physical Downlink Control Channel) of a subframe bearing a unicast service, and the eNB sends the M-RNTI repeatedly on the PDCCH on each paging occasion during a DRX period; and in a multi-cell mode, a radio frame and a subframe thereof that bear the MBMS are configured for an MBSFN area according to related information of the MBMS in the MBSFN area, and the M-RNTI is borne on a PDCCH of the configured subframe bearing the MBMS.

In conclusion, the present invention mainly includes the contents as follow:

1. radio frames or radio subframes that bear a notification indication of an MCCH information change, i.e. the M-RNTI, are indicated in a system broadcast message of the eNB;

2. the eNB sends the M-RNTI repeatedly on a PDCCH of these specified radio frames or radio subframes on each paging occasion during the DRX period;

3. firstly, the UE knows which radio frames or radio subframes bear the M-RNTI through receiving of the system broadcast message; and then, the UE detects the M-RNTI on the PDCCH of these radio frames or radio subframes on each paging occasion;

4. the UE reads information in DCI corresponding to the M-RNTI on the PDCCH and can acquire an MBMS Identifier if the MBMS Identifier is included in the information encapsulated in the DCI; and 5. the UE continues reading the information of the MCCH or matches the MBMS Identifier acquired from the DCI with that in a local MBMS list that is activated or needed to be received by the UE; and if the both MBMS Identifiers are matched, the UE reads the changed information of the MCCH, if not, the UE does not read the changed information of the MCCH.

Besides, in order to reduce signaling loads, it may be prescribed that the M-RNTI is borne in a fixed position in a related radio frame, for example, the M-RNTI is borne in the first subframe of the radio frame, and the serial number of the related radio frame may be set dynamically in a system message, which is related to the modification period of the MCCH.

Here, it needs to be pointed out that the MBMS Control Channel is uniformly expressed as an MCCH below; and if a layered structure is adopted, the MCCH below refers to a P-MCCH or an S-MCCH.

Embodiment 1: in an MBMS single-cell transmission mode, or in an MBSFN transmission with only one cell in the MBSFN area.

The Rel-8 LTE prescribes that a single-cell MCCH is borne and transmitted on a DL-SCH, and the DL-SCH is mapped to a Physical Downlink Shared Channel (PDSCH). A resource configuration in the PDSCH can be indicated through a PDCCH.

The MCCH is placed in a subframe bearing a unicast service, and an M-RNTI for identifying a notification of an information change of the MCCH is borne on a PDCCH in the subframe, wherein the M-RNTI is a specific value preset by the eNB and the UE and is known by the UE in advance; an information change of the MCCH is borne on a PDSCH in the subframe; and the M-RNTI helps the UE to acquire the information change of the MCCH. The eNB sends the M-RNTI repeatedly on each paging occasion during a DRX period; and the UE determines whether to further read the information change of the MCCH according to the information acquired from the DCI corresponding to the M-RNTI.

Then it will be described how the eNB notifies the UE of a notification of an information change.

In a system broadcast message, the eNB sends information of a radio frame or a radio subframe bearing a notification message about an information change of the MCCH to the UE. If the notification message of the information change of the MCCH occurs, the eNB sends the M-RNTI repeatedly on the PDCCH in the subframe on each paging occasion during a DRX period.

Figure 3:
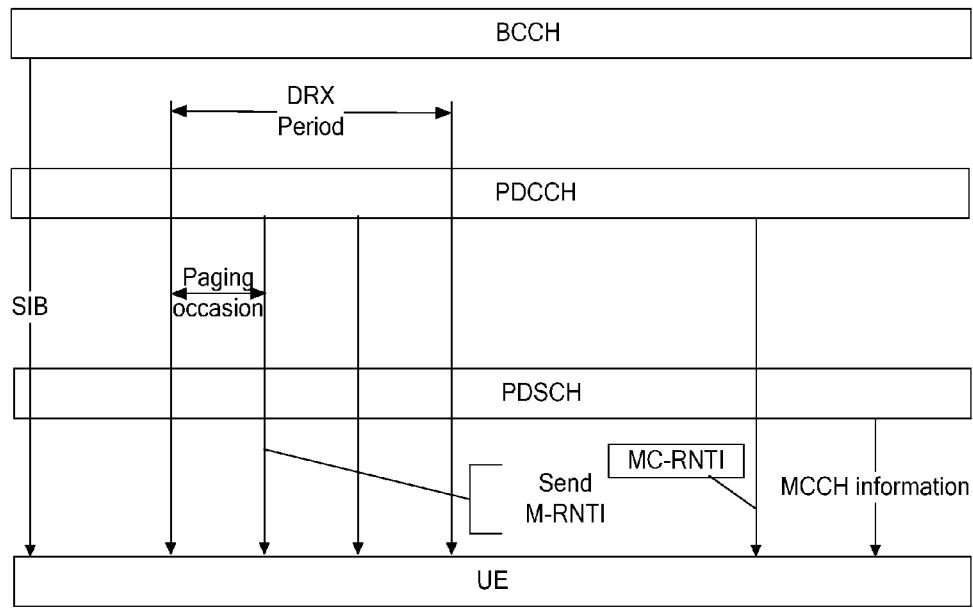
FIG. 3 is a schematic diagram of transporting an M-RNTI on channels according to the present invention.

On each paging occasion, the UE detects the M-RNTI on the PDCCH in the subframe, acquires a related MBMS Identifier in the DCI, and matches it with an MBMS Identifier in an MBMS list that is stored locally at or set to be received by the UE; if the both MBMS Identifiers are matched, the UE needs to further read the information of the MCCH on the PDSCH in the subframe bearing the MCCH. As shown in FIG. 3, the UE reads an information change of an MCCH on a PDSCH of a related subframe through an MC-RNTI shown in FIG. 3 according to an indication of a system message. If the both MBMS Identifiers are not matched, the UE does not need to read the information change of the MCCH, wherein the MC-RNTI is an abbreviation for an MCCH-RNTI and is used for indicating the position information of the MCCH. As shown in FIG. 3, a System Information Block (SIB) includes the position information of the M-RNTI and the MC-RNTI, and the transmitted M-RNTI includes the MBMS Identifier.

Embodiment 2: in an MBMS multi-cell transmission mode, also called in an MBSFN.

In the latest work item description of the LTE Rel-9, the description about an MCCH is that the MCCH does not support the amalgamation of MBSFNs and may not consider the primary-secondary structure. The MCCH may be transmitted on a DL-SCH or an MCH.

According to the current regulation about an MCCH in the LTE, the MCCH in an MBSFN area is required to be borne in a subframe distributed in the area and bearing an MBMS of the area. For an MBSFN area, the system can configure a corresponding radio frame and some subframes in the radio frame bearing an MBMS according to related information of the MBMS in the MBSFN area, such as information of the MBMS quantity, so as to send the MBMS in the MBSFN area.

The system side places the MCCH in a related subframe of an MBSFN radio frame configured in the system, such as the first subframe, and an M-RNTI used for identifying a notification of an information change of the MCCH is borne on a PDCCH of the subframe, wherein the M-RNTI is a specific value preset by the eNB and the UE and is known by the UE in advance; and the information change of the MCCH are borne on the PDSCH of the subframe; and the M-RNTI helps the UE to acquire the information change of the MCCH. The eNB sends the M-RNTI repeatedly on each paging occasion during the DRX period; and the UE determines whether to further read the information change of the MCCH according to the information acquired from DCI corresponding to the M-RNTI.

Compared with the Embodiment 1, here, the radio frame bearing an MCCH is required to be a radio frame bearing an MBMS; however, in the Embodiment 1, the radio frame bearing an MCCH may be a non-MBSFN radio frame.

It will be described hereinafter how the eNB notifies the UE of a notification of a information change of the MCCH.

In a system broadcast message, the eNB sends information of a radio frame or a radio subframe bearing a notification message about an information change of the MCCH to the UE. If the notification message about an information change of the MCCH occurs, the eNB sends the M-RNTI repeatedly on the PDCCH of the subframe on each paging occasion during the DRX period.

On each paging occasion, the UE detects the M-RNTI on the PDCCH of the subframe, and acquires a related MBMS Identifier in the DCI and match this MBMS Identifier with an MBMS Identifier in an MBMS list that is stored locally at the UE or set to be received by the UE; if the both MBMS Identifiers are matched, the UE needs to further read the information of the MCCH on the PDSCH of the subframe bearing the MCCH; as shown in FIG. 3, the UE reads an information change of an MCCH on a PDSCH of a related subframe through an MC-RNTI according to an indication of a system message. If the both MBMS Identifiers are not matched, the UE does not need to read the information change of the MCCH. Wherein the MC-RNTI is an abbreviation for an MCCH-RNTI and is used for indicating the position information of the MCCH.

Embodiment 3: in an MBMS multi-cell transmission mode, also called in an MBSFN.

In the latest work item description of the LTE Rel-9, the description about an MCCH is that the MCCH does not support the amalgamation of MBSFNs and does not consider the primary-secondary structure. The MCCH is transmitted on an MCH.

According to the current regulation about an MCCH in the LTE, an MCCH in an MBSFN area is required to be borne in a subframe distributed in the area and bearing an MBMS of the area. For an MBSFN area, the system can configure a corresponding radio frame and some subframes in the radio frame bearing an MBMS according to related information of the MBMS in the MBSFN area, such as information of the MBMS quantity, so as to send the MBMS in the MBSFN area.

The system side places the MCCH in a related subframe in an MBSFN radio frame configured in the system, such as the first subframe; an M-RNTI used for identifying a notification about an information change of the MCCH is borne in a PDCCH of the subframe, wherein the M-RNTI is a specific value preset by the eNB and the UE and is known by the UE in advance; the information change of the MCCH is borne in data division of the subframe; and the M-RNTI helps the UE to acquire the information change of the MCCH. The UE acquires information from DCI corresponding to the M-RNTI and continues reading the information of the MCCH.

Compared with the Embodiment 2, here, there is no MBMS Identifier in the DCI, so the UE continues reading the information of the MCCH.

It will be described below how the eNB notifies the UE of a notification about an information change of the MCCH.

In a system broadcast message, the eNB sends a radio frame or a radio subframe bearing a notification message about an information change of the MCCH to the UE. If the notification message about an information change of the MCCH occurs, the eNB sends the M-RNTI on the PDCCH of the subframe.

Figure 4:
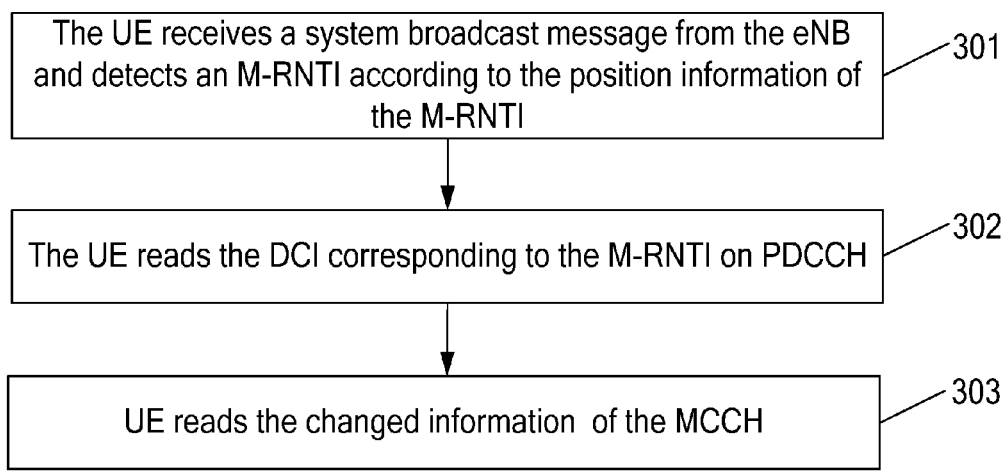
FIG. 4 is a flow chart of UE reading information of an MCCH according to the present invention.

As shown in FIG. 4, the flow of the UE reading the information of the MCCH comprises the following steps:

step 301: the UE receives a system broadcast message from the eNB and detects an M-RNTI on a PDCCH of a subframe according to position information of the M-RNTI;

step 302: the UE reads DCI corresponding to the M-RNTI on the PDCCH; and step 303: the UE acquires related notification information of the MCCH from the DCI, and reads changed information of the MCCH.

A notification system for an information change of an MCCH comprises a notification unit on a base station side and a reading unit on a UE side; or the system comprises a notification unit on a base station side and a determination unit on a UE side. The notification unit on the base station side is configured for the base station side to indicate with an M-RNTI that the information of the MCCH has a change and notify the UE side. The reading unit on the UE side is configured for the UE to continue reading the information of the MCCH after the UE detects the M-RNTI. The determination unit on the UE side is configured for the UE to determine whether to continue reading changed information of the MCCH according to the service requirements of itself after the UE detects the M-RNTI.

Here, the notification unit is further configured to notify the UE of position information of the M-RNTI via a system broadcast message, and encapsulate an MBMS Identifier into DCI corresponding to the M-RNTI.

Here, the determination unit further comprises a detection module, an acquisition module and a matching module. The detection module is configured for the UE to detect the M-RNTI according to the position information of the M-RNTI. The is acquisition module is configured for the UE to read DCI corresponding to the M-RNTI according to the M-RNTI and acquire the MBMS Identifier from the DCI. The matching module is configured to match the MBMS Identifier with that in an MBMS list on the UE side, and if the both MBMS Identifiers are matched, continue reading the changed information of the MCCH, if not, not read the changed information of the MCCH.

The above are only preferred embodiments of the present invention, but are not intended to limit the scope of protection of the present invention.

What is claimed is:

1. A notification method for an information change of a Multimedia Broadcast Multicast Service Control Channel (MCCH), comprising:

on a base station side, indicating with a Multimedia Broadcast Multicast Service Radio Network Temporary Identifier (M-RNTI) that information of an MCCH has a change, and notifying, by an evolved Node B (eNB), a User Equipment (UE) side of position information of the M-RNTI via a system broadcast message, wherein the M-RNTI is a value preset by the eNB with the UE, and the position information of the M-RNTI comprises information on radio frames or radio subframes that bear the M-RNTI; and on the UE side, after detecting the M-RNTI, reading Downlink Control Information (DCI) corresponding to the M-RNTI, and continuing reading the information of the MCCH when it is determined that no MBMS Identifier exists in the DCI, or determining whether to continue reading changed information of the MCCH according to service requirements of the UE when it is determined that an MBMS Identifier exists in the DCI.

2. The method according to claim 1, further comprising: encapsulating, by the eNB, an MBMS Identifier into the DCI corresponding to the M-RNTI.

3. The method according to claim 2, wherein the determining by the UE whether to continue reading changed information of the MCCH after the UE detects the M-RNTI according to the position information of the M-RNTI, comprises:
  reading, by the UE, DCI corresponding to the M-RNTI according to the M-RNTI, acquiring the MBMS identifier from the DCI, and matching the MBMS identifier with that in an MBMS list on the UE side; if the both MBMS identifiers are matched, continuing reading the changed information of the MCCH, if not, not reading the changed information of the MCCH.

4. The method according to claim 3, further comprising: in a single-cell mode, bearing the M-RNTI on a Physical Downlink Control Channel (PDCCH) of a subframe bearing a unicast service; and sending by the eNB the M-RNTI repeatedly on the PDCCH on each paging occasion during a Discontinuous Reception (DRX) period;
  in a multi-cell mode, configuring a radio frame and a subframe thereof that bear an MBMS for an MBSFN area according to related information of the MBMS in the MBSFN area; and bearing the M-RNTI on a PDCCH of the configured subframe bearing the MBMS.

5. A notification system for an information change of a Multimedia Broadcast Multicast Service Control Channel (MCCH) comprising a notification unit on a base station side and a reading unit on a UE side; or comprising a notification unit on a base station side and a determination unit on a UE side; wherein,
  the notification unit on the base station side is configured for the base station side to indicate with a Multimedia Broadcast Multicast Service Control Channel Radio Network Temporary Identifier (M-RNTI) that information of an MCCH has a change, and notify the UE side of position information of the M-RNTI via a system broadcast message, wherein the M-RNTI is a value preset by the eNB with the UE, and the position information of the M-RNTI comprises information on radio frames or radio subframes that bear the M-RNTI;
  the reading unit on the UE side is configured for the UE to read, after the UE detects the M-RNTI, Downlink Control Information (DCI) corresponding to the M-RNTI, and continue reading the information of the MCCH when it is determined that no MBMS Identifier exists in the DCI;
  and the determination unit on the UE side is configured for the UE to determine, after the UE detects the M-RNTI, whether to continue reading changed information of the MCCH according to service requirements of the UE when it is determined that an MBMS Identifier exists in the DCI.

6. The system according to claim 5, wherein the notification unit is further configured to encapsulate an MBMS Identifier into the DCI corresponding to the M-RNTI.

7. The system according to claim 6, wherein the determination unit further comprises a detection module, an acquisition module and a matching module;
  wherein the detection module is configured for the UE to detect the M-RNTI according to the position information of the M-RNTI;
  the acquisition module is configured for the UE to read DCI corresponding to the M-RNTI according to the M-RNTI and acquire the MBMS identifier from the DCI;
  and the matching module is configured to match the MBMS identifier with that in an MBMS list on the UE side; if the both MBMS identifiers are matched, continue reading the changed information of the MCCH, if not, not read the changed information of the MCCH.

* * * * *